United States Patent
Sneag et al.

(10) Patent No.: US 12,458,244 B2
(45) Date of Patent: Nov. 4, 2025

(54) SYSTEM AND METHOD FOR MAGNETIC RESONANCE NEUROGRAPHY USING INTRAVENOUS ULTRASMALL SUPRAPARAMAGNETIC IRON OXIDE PARTICLES

(71) Applicant: NEW YORK SOCIETY FOR THE RELIEF OF THE RUPTURED AND CRIPPLED, MAINTAINING THE HOSPITAL FOR SPECIAL SURGERY, New York, NY (US)

(72) Inventors: Darryl B. Sneag, Plainview, NY (US); Ek Tsoon Tan, Westbury, NY (US)

(73) Assignee: NEW YORK SOCIETY FOR THE RELIEF OF THE RUPTURED AND CRIPPLED, MAINTAINING THE HOSPITAL FOR SPECIAL SURGERY, New York, NY (US)

( * ) Notice: Subject to any disclaimer, the term of this patent is extended or adjusted under 35 U.S.C. 154(b) by 282 days.

(21) Appl. No.: 18/043,264

(22) PCT Filed: Sep. 3, 2021

(86) PCT No.: PCT/US2021/049042
§ 371 (c)(1),
(2) Date: Feb. 27, 2023

(87) PCT Pub. No.: WO2022/051611
PCT Pub. Date: Mar. 10, 2022

(65) Prior Publication Data
US 2023/0320612 A1    Oct. 12, 2023

Related U.S. Application Data

(60) Provisional application No. 63/074,911, filed on Sep. 4, 2020.

(51) Int. Cl.
*A61B 5/00* (2006.01)
*A61B 5/055* (2006.01)
(Continued)

(52) U.S. Cl.
CPC .......... *A61B 5/055* (2013.01); *G01R 33/4822* (2013.01); *G01R 33/5601* (2013.01)

(58) Field of Classification Search
CPC ...................................................... A61B 5/055
See application file for complete search history.

(56) References Cited

U.S. PATENT DOCUMENTS 5,560,360 A    10/1996 Filler et al.
8,170,642 B2    5/2012 Yan et al.
(Continued)

OTHER PUBLICATIONS

Aime et al., "Biodistribution of gadolinium-based contrast agents, including gadolinium deposition," J Magn Reson Imaging, Dec. 2009, 30(6):1259-67.

(Continued)

*Primary Examiner* — Joseph M Santos Rodriguez
(74) *Attorney, Agent, or Firm* — Fish & Richardson P.C.

(57) ABSTRACT

Some implementations provide a method for imaging one or more peripheral nerves in a region of a subject, which method includes: introducing a dose of an iron-based agent into the subject, wherein the dose causes a reduction of a T2 relaxation time of the subject's blood; and acquiring, from a magnetic resonance imaging (MRI) scanner, one or more fluid-sensitive MRI images of the region of the subject that has received the dose. The magnetic resonance (MR) signals from the subjects blood in the region is substantially reduced in response to the dose of the iron-based agent.

18 Claims, 7 Drawing Sheets

(51) Int. Cl.
*G01R 33/48* (2006.01)
*G01R 33/56* (2006.01)

(56) References Cited

U.S. PATENT DOCUMENTS

2008/0206146 A1 8/2008 Akhtari et al.
2017/0071496 A1 3/2017 Gillies et al.
2019/0094323 A1 3/2019 Kaufman et al.

OTHER PUBLICATIONS

Chen et al., "Value of enhancement technique in 3D-T2-STIR images of the brachial plexus," J Comput Assist Tomogr., 2014, 38(3):335-9.
International Preliminary Report on Patentability in International Appln. No. PCT/US2021/049042, dated Mar. 16, 2023, 7 pages.
International Search Report and Written Opinion in International Appln. No. PCT/US2021/049042, dated Dec. 2, 2021, 8 pages.
Knobloch et al., "Relaxivity of ferumoxytol at 1.5 T and 3.0 T," Invest Radiol., 2017, 7 pages.
Maki et al., "Dark blood magnetic resonance lymphangiography using dual-agent relaxivity contrast (DARC-MRL): a novel method combining gadolinium and iron contrast agents," Curr Probl Diagn Radiol., 2016, 45(3):174-9.
Mitsumori et al., "Peripheral magnetic resonance lymphangiography: techniques and applications," Tech Vasc Interv Radiol., 2016, 19(4):262-72.
Nguyen et al., "Ferumoxytol-enhanced MR angiography for vascular access mapping before transcatheter aortic valve replacement in patients with renal impairment: a step toward patient-specific care," Radiology, 2018, 286(1):326-37.
Extended European Search Report in European Appln. No. 21865184.2, mailed on Jul. 23, 2025, 10 pages.
Stoll et al., "Imaging of inflammation in the peripheral and central nervous system by magnetic resonance imaging,".

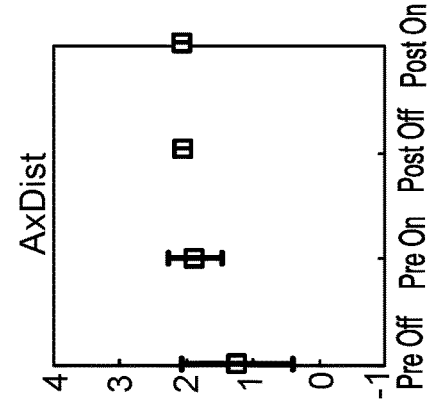
FIG. 6A
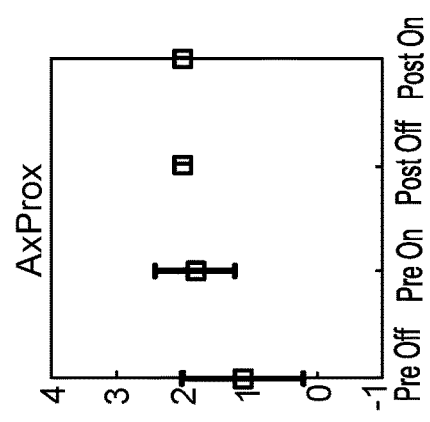
FIG. 6B
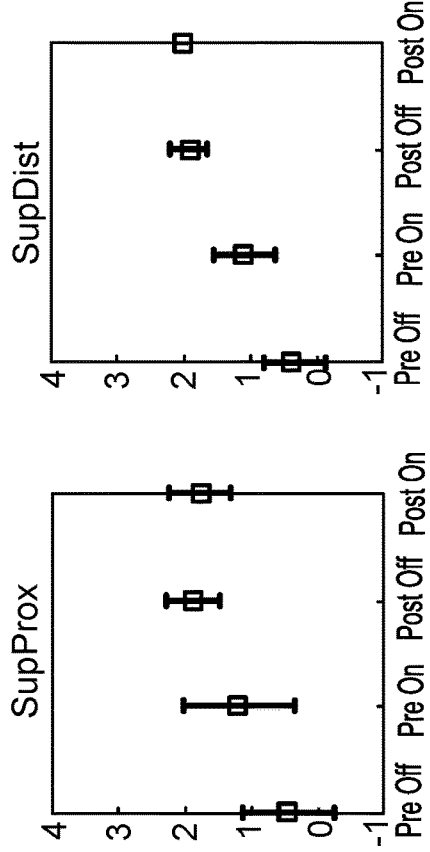
FIG. 6C
FIG. 6D
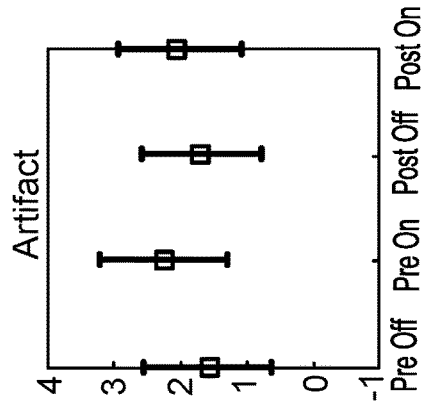
FIG. 6E
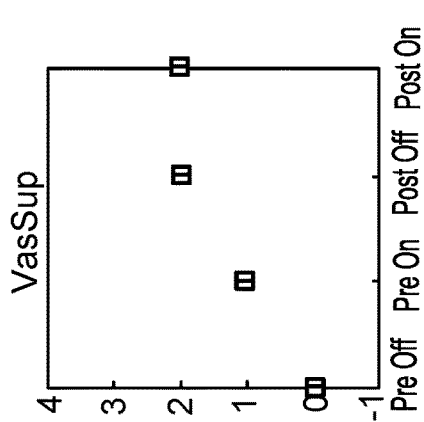
FIG. 6F
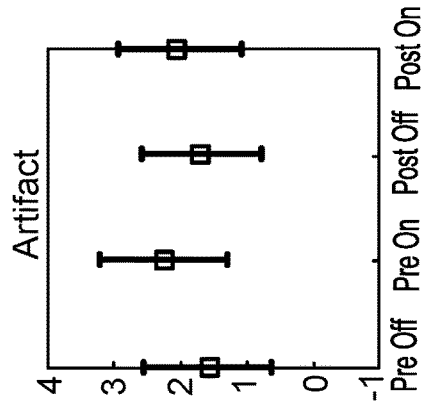
FIG. 6G
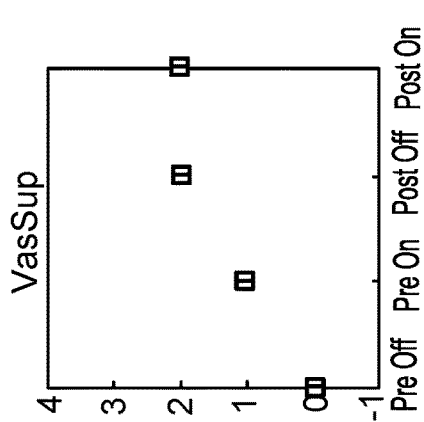
FIG. 6H

SYSTEM AND METHOD FOR MAGNETIC RESONANCE NEUROGRAPHY USING INTRAVENOUS ULTRASMALL SUPRAPARAMAGNETIC IRON OXIDE PARTICLES

TECHNICAL FIELD

This description generally relates to magnetic resonance imaging (MRI).

BACKGROUND

MRI provides soft-tissue images with superior contrast compared to other imaging modalities and has therefore become widely used for human imaging. Image contrast in MRI can be enhanced by judicious use of contrast agents.

SUMMARY

In one aspect, some implementations provide a method for imaging one or more peripheral nerves in a region of a subject, which method includes: introducing a dose of an iron-based agent into the subject, wherein the dose causes a reduction of a $T_2$ relaxation time of the subject's blood; and acquiring, from a magnetic resonance imaging (MRI) scanner, one or more fluid-sensitive MRI images of the region of the subject that has received the dose.

Implementations may include one or more of the following features:

The one or more fluid-sensitive MRI images may include at least one T2-weighted MRI images. The one or more fluid-sensitive MRI images may also include intermediate MRI images with more proton-density weighting. The magnetic resonance (MR) signals from the subject's blood in the region is substantially reduced in response to the dose of the iron-based agent. The iron-based agent may include: at least one of an ultrasmall supraparamagnetic iron oxide (USPIO) agent, a supraparamagnetic iron oxide (SPIO) agent, and a non-SPIO iron-based agent. The USPIO agent may include one of: Feraheme or ferumoxytol. Ferumoxytol, also known as Feraheme and Rienso, is an $Fe_3O_4$ preparation. The dose of the agent may be about 5-50% of a nominal dose of the USPIO agent with respect to a concentration of Fe. The dose of the agent may be computed based, in part, on a difference between the $T_1$ relaxation time of the subject's blood and the $T_1$ relaxation time of the subject's fat. The $T_1$ relaxation time of the subject's blood may be reduced to about the $T_1$ relaxation time of the subject's fat.

Acquiring one or more fluid-sensitive Mill images may include operating the MRI scanner using an acquisition sequence that includes at least one of: an inversion recovery fast spin echo sequence, a fat-suppression or non-fat suppression fast spin echo sequence, a multi-echo chemical shift (Dixon) sequence, a steady-state free procession (e.g. PSIF) sequence. The acquisition sequence may use an echo times (TE) of TE≥25 ms.

The acquired one or more fluid-sensitive MRI images may be characterized by a ratio of signals from the one or more nerves in the region and the signals from the subject's blood, and wherein the ratio is 10 or more. In some embodiments, the ratio may be 50 or more.

The imaging method may include: identifying the one or more peripheral nerves from the region on the acquired one or more $T_2$-weighted Mill images. The acquired one or more $T_2$-weighted MRI images may include: 3-D images, or multi-slices (2D) of images. The method may include providing a 3-D rendering of the one or more peripheral nerves from the region. The method may further include: longitudinally acquiring the one or more $T_2$-weighted MRI images of the subject from a period of time such that the one or more peripheral nerves are tracked over the period of time.

Introducing a dose may include one of: intravenous injection of the iron-based agent while a subject is being actively scanned on the MRI scanner to acquire the one or more $T_2$-weighted Mill images, or infusion of the iron-based agent prior to operating the Mill scanner to acquire the one or more $T_2$-weighted Mill images.

The details of one or more aspects of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Embodiments will now be described, by way of example only, with reference to the drawings, in which:

FIG. 6A to 6H demonstrate resulting scores of nerve conspicuity from various configurations according to some implementations of the present disclosure.

Like reference symbols in the various drawings indicate like elements.

DETAILED DESCRIPTION

Figure 1:
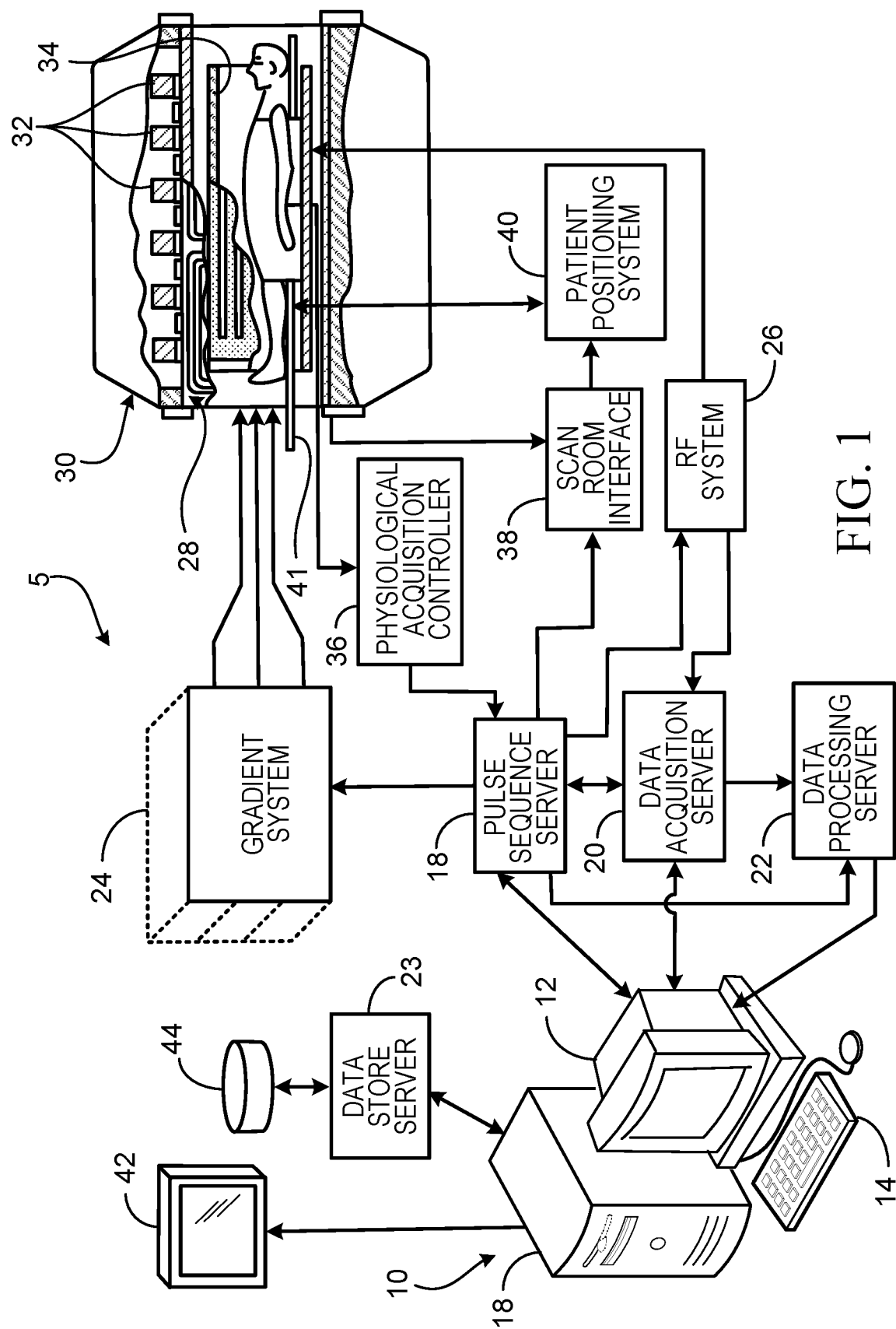
FIG. 1 shows an example of an magnetic resonance imaging (MRI) system as used by some implementations of the present disclosure.

Magnetic resonance imaging (MRI) plays a significant role in the diagnosis and management of peripheral neuropathies. Dedicated, high-resolution peripheral nerve MRI or magnetic resonance (MR) neurography, however, can be technically challenging to perform and difficult to accurately interpret. While some neuropathies manifest as diffuse $T_2$-weighted signal hyperintensity and enlargement of peripheral nerves, the majority of neuropathies encompass focal and sometimes subtle findings in a background of similar contrast and intensity. To complicate matters, small-caliber (<1-2 mm in diameter) nerves often take a circuitous course through intra- and inter-muscular fascial planes and run alongside blood vessels, impeding reliable nerve identification and evaluation.

MR techniques that use non-contrast, vascular suppression may be able to suppress vascular signal arising from arteries and large veins. However, such MR techniques are generally unsuccessful in suppressing signal from smaller, slow-flowing veins. As such, several commonly affected peripheral nerves arising from the brachial plexus (e.g. long thoracic, suprascapular and phrenic) and lumbosacral plexus (e.g. genitofemoral and pudendal) can be difficult or infeasible to evaluate along the entirety of their course with confidence.

Implementations provided by the present disclosure pertain to fluid-sensitive MRI sequences, which generally are sensitive to the presence of mobile water. Examples of fluid-sensitive MRI images can include T2-weighted MRI images or intermediate MRI images with more proton density weighting. By way of illustration, the presence of blood vessels adjacent to nerves, such as a peripheral nerves, can confound reliable identification of the nerve as the blood vessel(s) and nerve may have very similar contrasts.

Contrast-enhanced techniques can improve the suppression of vascular signal in MR neurograpnhy and allow for more reliable peripheral nerve identification. Feraheme (generic name ferumoxtyol), for example, manufactured by AMAG Pharmaceuticals, Waltham, MA, is an iron-based contrast-agent containing ultrasmall supraparamagnetic iron oxide (USPIO) particles. Ferumoxytol is an FDA-approved agent administered via intravenous (IV) infusion for the treatment of chronic iron-deficiency anemia. Some implementations of the present method demonstrate the use of ferumoxytol as a single contrast agent in MR neurography for reliable peripheral nerve identification for the first time. In comparison, although prior implementations have used ferumoxytol to suppress signal in slow-flow extremity veins during MR lymphangiography, such applications involve a double-contrast technique, involving not only IV infusion of ferumoxytol but also subcutaneous injection of gadolinium. Indeed, implementations described in the present disclosure provide an unprecedented ability to effectively nullify water signals from vasculature adjacent to a nerve by a judicious selection of MRI image parameters following intravenous injection of a single contrast agent.

FIG. 1 shows an example of a magnetic resonance imaging (MRI) system 5 with a solenoid magnet for imaging knee joints. The MRI system 5 includes a workstation 10 having a display 12 and a keyboard 14. The workstation 10 includes a processor 16 that is a commercially available programmable machine running a commercially available operating system. The workstation 10 provides the operator interface that enables scan prescriptions to be entered into the MRI system 5. The workstation 10 is coupled to four servers including a pulse sequence server 18, a data acquisition server 20, a data processing server 22, and a data store server 23. The work station 10 and each server 18, 20, 22 and 23 are connected to communicate with each other.

The pulse sequence server 18 functions in response to instructions downloaded from the workstation 10 to operate a gradient system 24 and a radio frequency (RF) system 26. Gradient waveforms necessary to perform the prescribed scan are produced and applied to the gradient system 24 that excites gradient coils in an assembly 28 to produce the magnetic field gradients Gx, Gy and Gz used for position-encoding MR signals. The gradient coil assembly 28 forms part of a magnet assembly 30 that includes a polarizing magnet 32 and a whole-body RF coil 34.

RF excitation waveforms are applied to the RF coil 34 by the RF system 26 to perform the prescribed magnetic resonance pulse sequence. Responsive MR signals detected by the RF coil 34 or a separate local coil (not shown in FIG. 1) are received by the RF system 26, amplified, demodulated, filtered, and digitized under direction of commands produced by the pulse sequence server 18. The RF system 26 includes an RF transmitter for producing a wide variety of RF pulses used in MR pulse sequences. The RF transmitter is responsive to the scan prescription and direction from the pulse sequence server 18 to produce RF pulses of the desired frequency, phase and pulse amplitude waveform. The generated RF pulses may be applied to the whole body RF coil 34 or to one or more local coils or coil arrays (not highlighted in FIG. 1).

The RF system 26 also includes one or more RF receiver channels. Each RF receiver channel includes an RF amplifier that amplifies the MR signal received by the coil to which it is connected and a detector that detects and digitizes the I (in-phase) and Q (quadrature) components of the received MR signal.

The pulse sequence server 18 also optionally receives patient or subject data from a physiological acquisition controller 36. The controller 36 receives signals from a number of different sensors connected to the patient, such as ECG signals from electrodes or respiratory signals from a bellows. Such signals are typically used by the pulse sequence server 18 to synchronize, or "gate", the performance of the scan with the subject's respiration or heartbeat.

The pulse sequence server 18 also connects to a scan room interface circuit 38 that receives signals from various sensors associated with the condition of the patient and the magnet system. It is also through the scan room interface circuit 38 that a patient positioning system 40 receives commands to move the patient to desired positions during the scan by translating the patient table 41.

The digitized MR signal samples produced by the RF system 26 are received by the data acquisition server 20. The data acquisition server 20 operates in response to instructions downloaded from the workstation 10 to receive the real-time MR data and provide buffer storage such that no data is lost by data overrun. In some scans the data acquisition server 20 does little more than pass the acquired MR data to the data processor server 22. However, in scans that require information derived from acquired MR data to control the further performance of the scan, the data acquisition server 20 is programmed to produce such information and convey it to the pulse sequence server 18. For example, during prescans, MR data is acquired and used to calibrate the pulse sequence performed by the pulse sequence server 18. Also, navigator signals may be acquired during a scan and used to adjust RF or gradient system operating parameters or to control the view order in which k-space is sampled. In all these examples the data acquisition server 20 acquires MR data and processes it in real-time to produce information that is used to control the scan.

The data processing server 22 receives MR data from the data acquisition server 20 and processes it in accordance with instructions downloaded from the workstation 10. Such processing may include, for example, Fourier transformation of raw k-space MR data to produce two or three dimensional images, the application of filters to a reconstructed image, the performance of a back projection image reconstruction of acquired MR data; the calculation of functional MR images, the calculation of motion or flow images, and the like.

Images reconstructed by the data processing server 22 are conveyed back to the workstation 10 where they are stored. Real-time images are stored in a data base memory cache (not shown) from which they may be output to operator display 12 or a display 42 that is located near the magnet assembly 30 for use by physicians. Batch mode images or selected real time images are stored in a host database on disc storage 44. When such images have been reconstructed and transferred to storage, the data processing server 22 notifies the data store server 23 on the workstation 10. The Workstation 10 may be used by an operator to archive the images, produce films, or send the images via a network to other facilities.

As shown in FIG. 1, the RF system 26 may be connected to the whole body RF coil 34 while a transmitter section of the RF system 26 may connect to one RF coil 152A and its receiver section may connect to a separate RF receive coil 152B. Often, the transmitter section is connected to the whole body RF coil 34 and each receiver section is connected to a separate local coil 152B. In this illustration, RF receive coil 152B can be a phased array coil.

Figure 2:
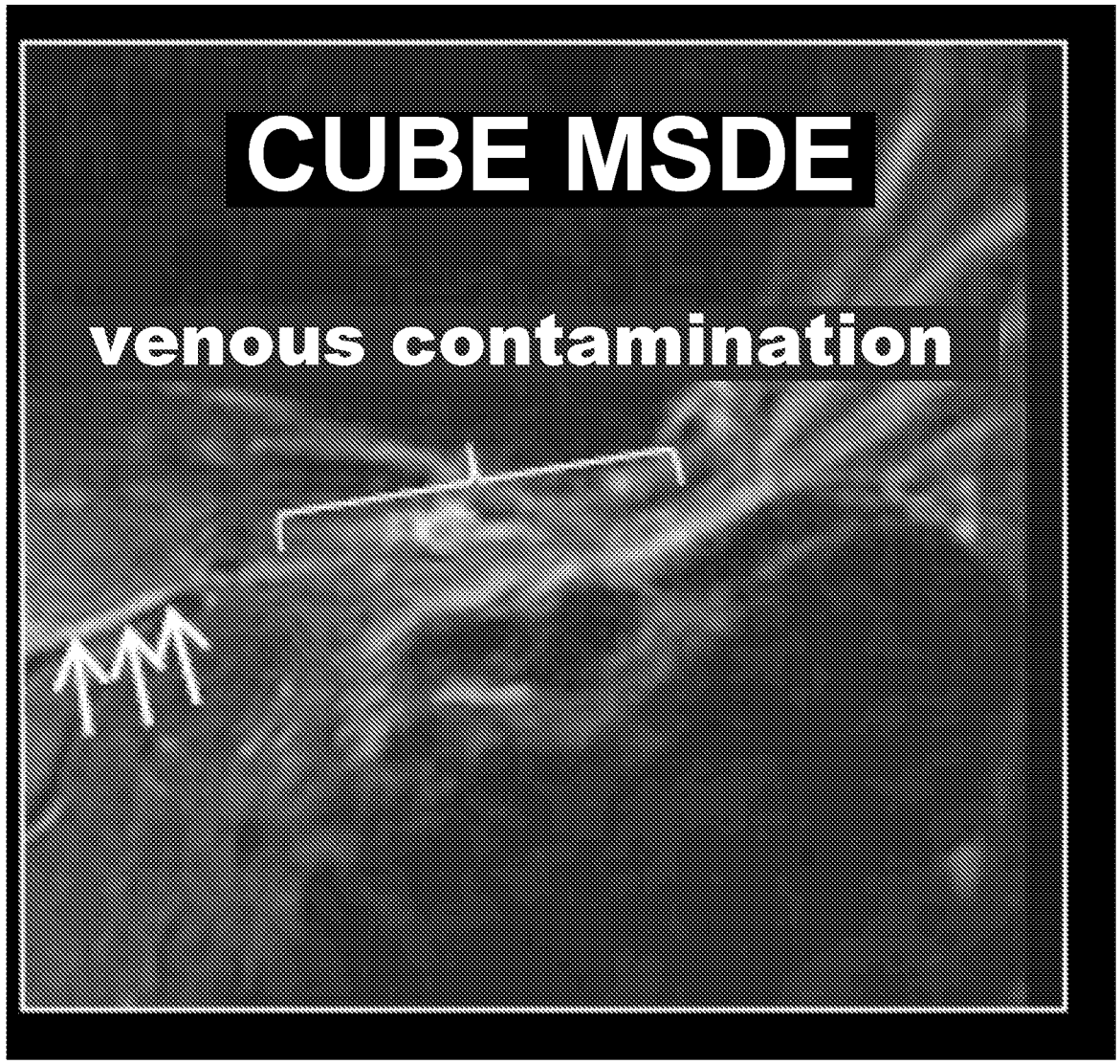
FIG. 2 illustrates an example of an MRI image of a peripheral nerve without contrast agent and $T_2$-weighted imaging sequence.

MR techniques may apply pulse sequences on MRI system 5 without the use of contrast agents for suppression of vascular signal arising from arteries and large veins. For example, non-contrast vascular suppression techniques contemplated for MR neurography include 3D diffusion-weighted PSIF (reverse fast imaging with steady state precession) and MSDE (motion sensitive driven equilibrium). While 3D diffusion-weighted PSIF may be successful in the extremities, it is generally unsuccessful for plexus imaging due to time and motion sensitivity. For example, 3D diffusion-weighted PSIF images of the brachial plexus may be contaminated by respiratory motion while 3D diffusion-weighted PSIF images of lumbosacral plexus may be corrupted by motion from the bowels. For MSDE techniques using flow-saturation pulses, the resulting MRI images generally fail to suppress signals from small slow-flow veins. Referring to FIG. 2, an example of a CUBE (3-D fast spin echo) MSDE image is shown to illustrate venous contamination of the brachial plexus images. As illustrated, the spurious venous signals can overlap and obscure the appearance of the brachial plexus nerves. Indeed, non-contrast vascular-suppression MR techniques are generally unsuccessful in suppressing signal from smaller, slow-flowing veins.

In this context, contrast-enhanced techniques can improve the suppression of vascular signal, thereby allowing for more reliable peripheral nerve identification. For example, intravenous (IV) injection of gadolinium can be used for vascular suppression. Here, a short tau inversion recovery (STIR) pulse sequence (with, for example, an inversion time TI of about 180 to 250 ms at 3.0 T) can suppress fat at the null point during recovery. Here, IV injection of gadolinium causes shortening of the $T_1$ of blood so that blood's $T_1$ approaches that of fat, thereby allowing vascular signals to be suppressed along with fat. While the post-STIR images may demonstrate significant improvement in vascular suppression and nerve visualization, safety concerns of nephrogenic systemic fibrosis (NSF) and gadolinium brain deposition remain. Such safety concerns often dissuade use of gadolinium-based contrast agents for some patients.

Some implementations of the present disclosure demonstrate the use of USPIO-based contrast agents, such as ferumoxytol, as a single contrast agent in MRN for reliable peripheral nerve identification for the first time. For additional context, USPIO-based contrast agents provide several advantages over conventional, gadolinium-based contrast agents (GBCAs).

First, USPIOs may exhibit longer intravascular half-life, for example, around 12 to 14 hours. In the case of ferumoxytol, the intravascular half-life time can be around 14 to 15 hours, due to its relatively large molecular size and carbohydrate coating. In comparison, most GBCAs only have a half-life time on the order of about 2 hours. In fact, the slower intracellular uptake allows USPIOs to be used as a blood-pool agent and therefore timing between contrast administration and imaging becomes less significant. For this reason alone, if a contrast MRI exam is needed, USPIOs could be administered prior to MRI rather than during MRI, which may improve MRI workflow.

Second, USPIOs may enable a novel imaging mechanism. In other words, the ability to image the dynamic, blood-pool and delayed phases provides a new paradigm for performing magnetic resonance angiography and other contrast-enhanced MRI exams. The use of USPIOs can be extended to image inflammation due to the preferential uptake of iron by macrophages. Some implementations employ, for example, fluid-sensitive pulse sequences (such as $T_2$ weighted pulse sequences) to leverage the contrast mechanism, different from the $T_1$ contrast mechanism, as in the case of gadolinium-based CAs.

Third, iron-based USPIOs may exhibit a new clearance pathway. For example, iron is also an intrinsic element in the body's metabolic pathway. As such, the use of USPIOs should not cause concerns about nephrogenic systemic fibrosis (NSF), because the USPIOs are filtered by the reticuloendothelial system rather than deposition in the kidney and brain as is the case with gadolinium-based contrast agents, which can cause toxicology concerns.

Fourth, introducing USPIOs for MR neurography can introduce a new contrast mechanism. Notably, the transverse relaxation rate ($R_2$) of USPIOs is also much higher, for example around 6-fold for ferumoxytol, than its longitudinal relaxation rate ($R_1$). This characteristic makes USPIO particles a more effective contrast agent for suppressing signal in $T_2$-weighted imaging. In comparison, the $R_2$ of gadolinium-based contrast agents is typically only about 1.2 to 1.5-fold higher than its $R_1$, which means gadolinium-based contrast agents are more effective for $T_1$-weighted imaging than $T_2$-weighted imaging.

Figure 3:
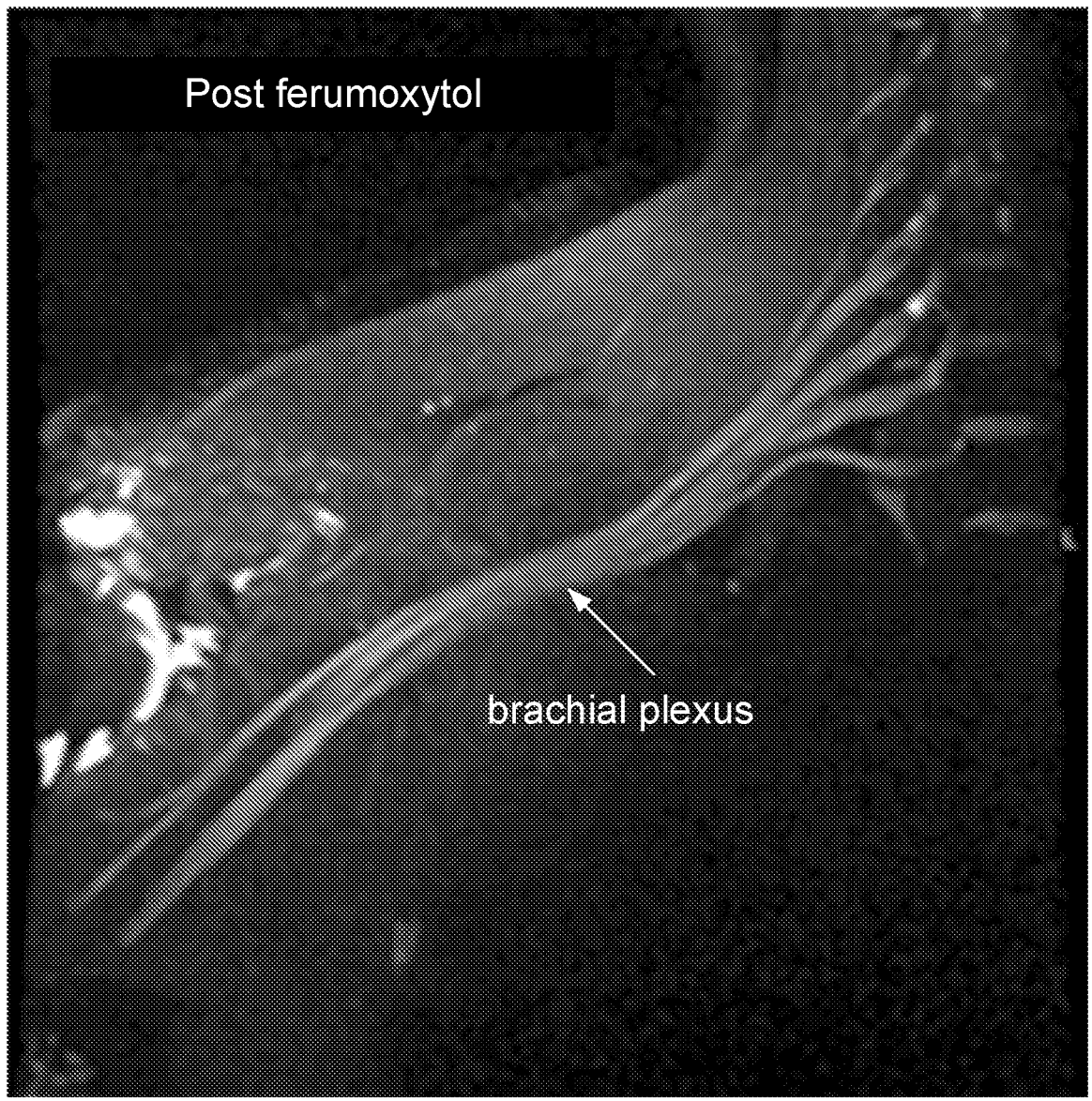
FIG. 3 illustrates an example of an MRI image of a peripheral nerve using iron-based contrast agent and $T_2$-weighted imaging sequence according to some implementations of the present disclosure.

Referring to FIG. 3, an MRI image of a brachial plexus post ferumoxytol is shown. Here, a coronal-plane $T_2$-weighted MR image of the brachial plexus acquired following intravenous (IV) administration of ferumoxtyol demonstrates excellent visualization of the nerves with substantially complete vascular suppression such that the distracting venous contamination is absent.

In more detail, the present image acquisition process involves administering intravenously (IV) ferumoxytol either as a slow infusion over, for example, 15 minutes prior to the MRI exam or conventional injection during the MIll exam. Here, the MIll may be performed using several pulse sequences, including, for example, $T_2$-weighted pulse sequences. An example of such a $T_2$-weighted pulse sequence is the three-dimensional short-tau inversion recovery (STIR) $T_2$-weighted fast spin echo (FSE) sequence. Another example is fat-suppressed $T_2$-weighted fast spin echo. Yet another example is chemical-shift (also known as the Dixon method), multi-echo fast spin echo imaging. Still another example is the reversed free induction steady-state precession (PSIF) method. These $T_2$-weighted sequences may be advantageous for visualizing peripheral nerves (MR neurography).

The characteristics of USPIOs also allow for efficient use of such contrast agents. In one example, the recommended intravenous (IV) dose for ferumoxytol administered for chronic iron-insufficiency anemia is 510 mg. In this example, the full dosage may be administered through two different infusions separated 3-8 days apart. As compared to gadolinium-based contrast agents, the nerve to iron (Fe)-blood contrast ratio can be much higher than that of the nerve-gadolinium (Gd) contrast ratio.

Figure 4A:
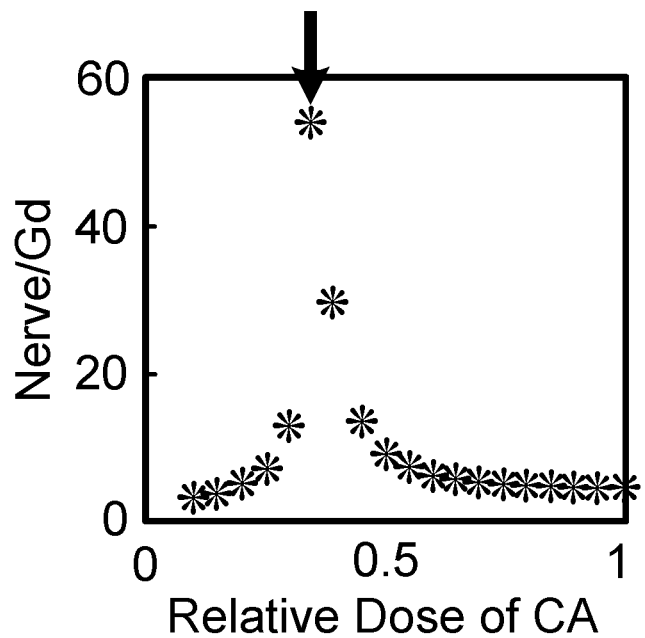
FIGS. 4A and 4B illustrates an example of a nerve-to-contrast-enhanced blood ratio as a function of the relative dose of contrast agent according to some implementations of the present disclosure.
Figure 4B:
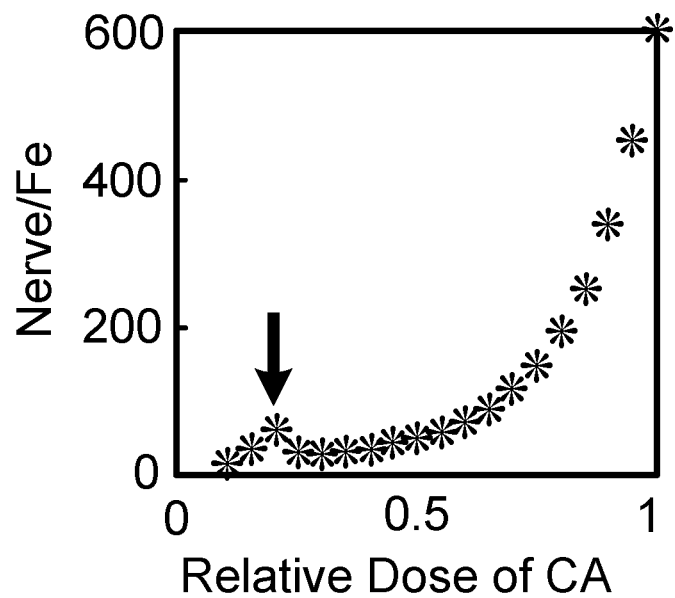

Referring to FIGS. 4A and 4B, simulation results reveal that a substantially lower dose (e.g., <50%) of USPIO based contrast agent can achieve adequate vascular suppression. This finding is significant because a reduced dose could potentially reduce the risk of anaphylaxis associated with, for example, ferumoxytol injection. Furthermore, a reduced dose would bring the relaxation of ferumoxytol-infused blood very close to that of subcutaneous fat. This would allow for a common null-point for fat and blood when a STIR $T_2$-weighted FSE sequence is used, which increases the effectiveness of vascular suppression with a low iron dose (e.g., at about 20%).

In more detail, the inversion time to obtain the null-point can be calculated by solving for the first-order differential equation, known as the Bloch equation. When the repetition time (TR) is significantly longer than the relaxation time (TR>>$1/R_{1,fat}$), the inversion time (TI) can be expressed as: TI=log(2)/($r_{1,Fe}$*C+$R_{1,blood}$), where $r_{1,Fe}$ is the longitudinal relaxation concentration rate constant for the contrast agent, C is the concentration of the contrast agent, and $R_{1,blood}$ is the longitudinal relaxation rate for blood, and $R_{1,fat}$ is the longitudinal relaxation rate for fat. To nullify fat, the inversion time (TI) can be set at: TI=log(2)/$R_{1,fat}$. The desired dose can be obtained by calculating the desired concentration to match the TI needed to nullify fat and blood simultaneously, for example, according to: C=($R_{1,fat}$−$R_{1,blood}$)/$r_{1,Fe}$.

FIGS. 4A and 4B respectively illustrate a nerve-to-gadolinium-enhanced blood ratio and a nerve-to-iron-enhanced blood ratio as a function of the relative dose of contrast agent. The nerve-to-gadolinium (Gd) ratio, as shown in FIG. 4A (indicated by arrow), is markedly lower than that of the nerve-to-iron (Fe) ratio, as shown in FIG. 4B (indicated by arrow). Here, peak contrast ratio for iron-based contrast agent (CA) at lower doses is observed at about 20% of the full dose, as compared to approximately 40% of the full dose for the case of gadolinium-based contrast agent.

Figure 5:
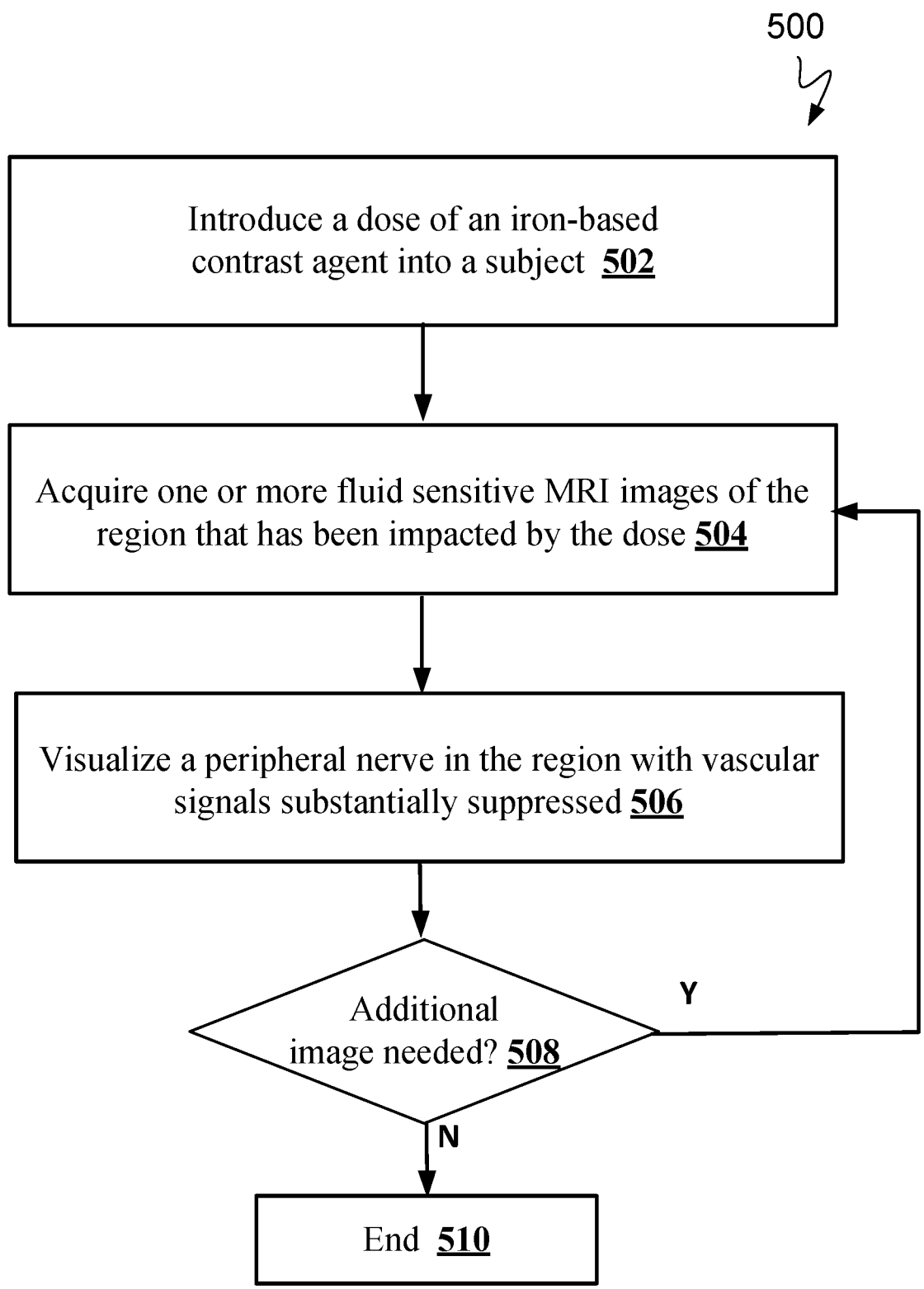
FIG. 5 is a flow chart illustrating an example of a workflow according to some implementations of the present disclosure.

FIG. 5 is a flow chart 500 illustrating an example of a process according to some implementations of the present disclosure. The process may introduce a dose of an iron-based contrast agent into a subject (502). The contrast agent can include: an ultrasmall supraparamagnetic iron oxide (USPIO) agent, a supraparamagnetic iron oxide (SPIO) agent, a non-SPIO agent. The dose of the agent can be about, for example, 5-30% of a nominal dose of the USPIO agent with respect to a concentration of Fe. The dose of the agent may be computed based in part on, a difference between a relaxation rate of the subject's blood and a relaxation rate of the subject's fat. Some implementations may seek to nullify the blood signal from an inversion recovery sequence in which the inversion recovery nullifies both the blood signal and the fat signal. Introducing the dose of iron-based contrast agent may include: an intravenous injection of the iron-based agent when acquiring the one or more fluid-sensitive MIll images, or an infusion of the iron-based agent prior to acquiring the one or more fluid-sensitive MRI images.

The process may acquire one or more fluid-sensitive MRI images of the region that has been impacted by the dose of the iron-based contrast agent (504). Acquiring the one or more $T_2$-weighted MIll images may include operating the MIll scanner using an acquisition sequence that includes at least one of: a STIR (short tau inversion recovery) fast spin echo sequence, a fat-suppression fast spin echo sequence, a multi-echo chemical shift (Dixon) sequence, or PSIF (time reversed Free Induction Steady-state Precession) sequence. The acquisition sequence may use an echo times (TE) of TE≥25 ms. The acquired one or more $T_2$-weighted MIll images may be characterized by a ratio of signals from the one or more nerves in the region and the signals from the subject's blood. In some cases, the ratio can be 10 or more. Alternatively or additionally, the ratio can be 50 or more.

The process may then visualize a peripheral nerve in the region in which vascular signals are substantially suppressed (506). As described, the inverse of the transverse relaxation time ($T_2$), the transverse relaxation rate ($R_2$), of the USPIOs is also much higher (for example, about 6-fold for ferumoxytol) than its longitudinal relaxation rate (R1). The shortened $T_2$ and larger $T_2$ over $T_1$ ratio render USPIO particles more effective for suppressing blood signal in $T_2$-weighted imaging.

In contrast, the R2 of gadolinium-based contrast agent is typically only about 1.2-1.5-fold higher than its R1, which means gadolinium-based contrast agent can be more effective for $T_1$-weighted imaging than $T_2$-weighted imaging. Applications involving both gadolinium-based contrast agent and ferumoxytol have focused on T1-weighted signal enhancement rather than on $T_2$ signal decay. For illustration, to achieve lymphatic visualization in MR lymphangiography, a dual-contrast technique has been used that includes a subcutaneous injection of gadolinium into lymphatics of the toe or hand webspaces. This causes 'enhancement' of lymphatics, generally not visible, relative to surrounding soft tissues. In this illustration, the subcutaneous gadolinium injection is preceded or followed by intravenous (IV) infusion of ferumoxytol for vascular suppression. Indeed, the illustration is premised on a dual contrast implementation in which a dual long-TE pair technique is used to nullify signal both from gadolinium and ferumoxytol.

In comparison, some implementations of the present disclosure use a single-contrast technique for nerve visualization in MRN. In these implementations, a non-contrast, heavily $T_2$-weighted and fat suppressed sequence, is generally obtained to substantially maximize the contrast of nerves relative to background tissue (CNR). For example, intravenous (IV) injection of ferumoxtyol may be infused before acquiring MR images using this $T_2$-weighted sequence. As described above, some implementations may use a $T_2$-weighted sequence to suppress intravascular blood doped with the ferumoxytol and adequate contrast to noise ratio when visualizing the peripheral nerve. In other words, implementations use a single echo long TE sequence in the single contrast approach.

Some implementations may seek longitudinal monitoring of the peripheral nerve. In this case, the process may then determine whether additional MRI images are needed (508). In response to determining that additional MRI images are still needed, some implementations may continue to acquire more fluid-sensitive MR images (504). In some cases, a new dose of the iron-based contrast agent may be entailed (502). In response to determining that additional MRI images are needed, the process may terminate (510).

Intravenous administration of gadolinium-based contrast agents can cause both $T_1$ and $T_2$ shortening. For this reason, the use of gadolinium-based contrast agent may allow for vascular suppression using short tau inversion recovery (STIR) imaging. As gadolinium shortens the $T_1$ of blood so that it becomes similar to $T_1$ of fat, blood signals can be suppressed with the same inversion pulse. However, there are potential safety hazards associated with gadolinium injections, including brain and other tissues and potential risk for nephrogenic systemic fibrosis.

In comparison, the USPIO contrast agent ferumoxytol, has the added benefit of remaining within the blood pool for an extended period with a blood-pool half-life of about 14 hours and therefore delayed imaging can theoretically be performed several days later to detect uptake in inflammatory pathologies affecting nerves (due to delayed intracellular macrophage uptake, a unique property compared to gadolinium). Benefits of ferumoxytol over gadolinium-based contrast also include its ability to be safely administered in patients with chronic renal insufficiency, a longer intravascular half-life allowing for steady-state imaging, and potentially less alteration in extravascular tissue signal.

Additionally, implementations may adapt the techniques for utilizing $T_2$-weighted sequences for magnetic resonance (MR) neurography with iron-based contrast agents to imaging of inflammation and Wallerian degeneration. For context, peripheral nerve injury (PNI) severity may be conventionally categorized by clinical and histological findings into neuropraxia, axonotmesis, and neurotmesis. While the process of nerve inflammation may follow any form of PNI, Wallerian degeneration (WD), however, generally follows axonal injury (axonotmesis and neurotmesis). Specifically, WD involves rapid clearance of axons distal to the injury site and subsequent influx of immune-mediated cells to clear debris. In these instances, macrophages are one of several critical cell types involved in both inflammation and in WD. For additional context, macrophages in the blood can demonstratively take up iron oxide particles, including USPIO. In these contexts, MRI studies in crush injury animal models (with histologic confirmation) have previously demonstrated in vivo visualization of macrophage recruitment and distal migration during WD due to their phagocytosis of intravenously (IV) administered iron-oxide particles 3-8 days post nerve-injury.

The implementations described in this disclosure can apply $T_2$-weighted MRI with iron-based contrast agents to detect inflammation. For example, some implementations can simultaneously provide vascular suppression and also detect signal changes in nerves due to the presence of macrophages.

Referring to experimental results presented in FIGS. 6-7, twelve healthy subjects (age=24.9+/−1.8 years, 6 female) were recruited for 3.0 Tesla MRI with low-dose Ferumoxytol (25% of 510 mg Fe) of the unilateral brachial plexus with a 1 mm-isotropic T2-weighted MR neurography sequence. Acquisitions were performed pre-Ferumoxytol infusion ("Pre") and within 1 hour post-infusion ("Post"), and with non-contrast added flow suppression crusher gradients turned off ("Off") or on ("On"). The images were evaluated by one radiologist with 8 years of dedicated musculoskeletal MRI experience.

Regions of interests were manually drawn to measure nerve/fat, nerve/muscle and nerve/vessel contrast ratios (CR). MR images were also evaluated for the following criteria:
1) conspicuity (from 0=not visualized to 2=fully visualized) of the suprascapular nerve (proximal, distal segments), axillary nerve (proximal, distal segments), and anterior and posterior divisions of the axillary nerve
2) overall vascular suppression (from 0=not suppressed to 2=fully suppressed)
3) artifact (from 0=no artifacts to 3=artifacts obscuring visualization of nerves).

FIG. 6A to 6H demonstrate resulting scores of nerve conspicuity of the suprascapular ("Sup") and axillary nerve ("Ax"), proximal ("Prox"), and distal ("Dist") segments as well as anterior ("Ant") and posterior ("Pos") axillary nerve distal division, along with resulting scores for vascular suppression ("VasSup") and Artifact. Here, "on" indicates activation of crusher gradients in the imaging sequence while "off" indicates the deactivation of crusher gradients in an imaging sequence. In general, the evaluated nerve segments were better visualized, as indicated by the elevated conspicuity score. These results appear consistent, regardless of whether crusher gradients are off or on during the imaging sequence. FIG. 6G further demonstrates that vascular suppression was superior with Ferumoxytol. As summarized in FIG. 6H, the level of image artifact was similar in all images.

Figure 7C:
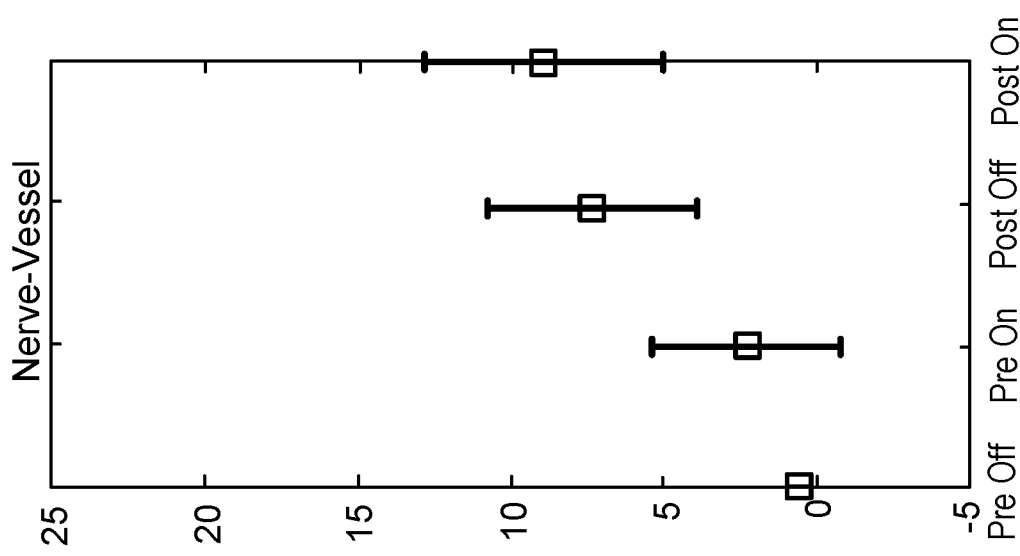
FIG. 7A to 7C show results of contrast ratio measurements for various regions according to some implementations of the present disclosure.
Figure 7B:
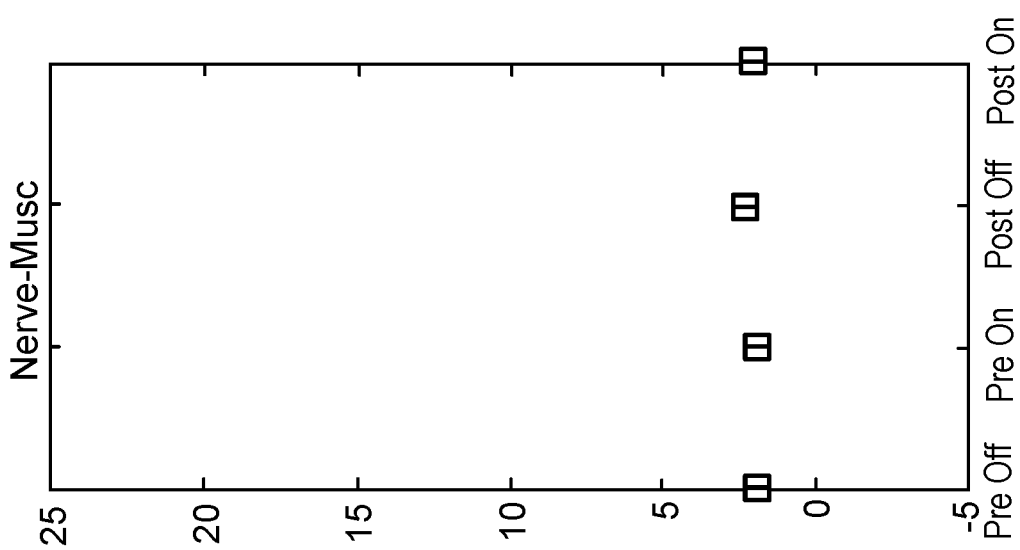
Figure 7A:
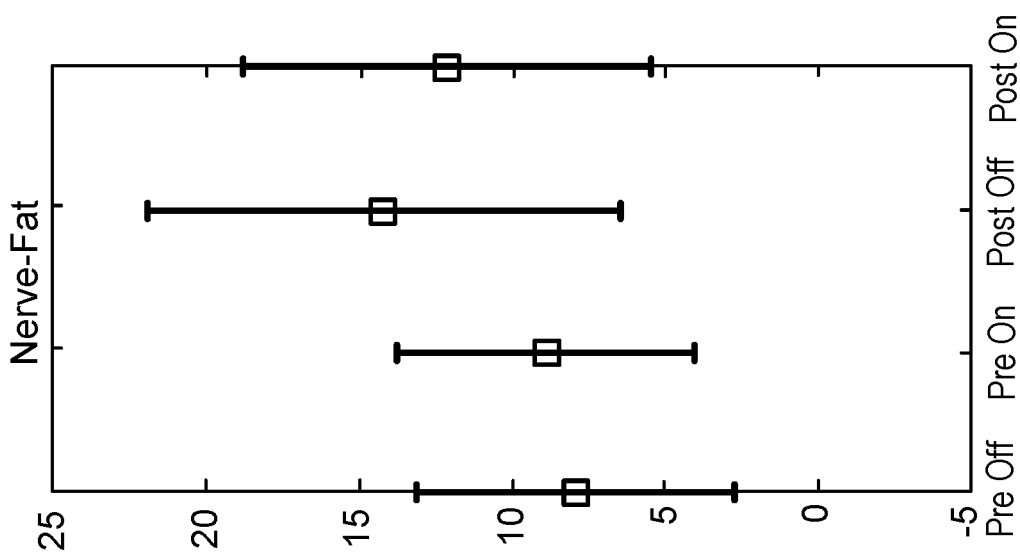

Additionally, FIG. 7A to 7C show results of contrast ratio measurements for nerve/fat, nerve/muscle, and nerve/vessel. Here, "pre" indicates pre-injection and "post" indicates post injection. Nerve/vessel contrast ratios progressively increased from "Pre Off" to "Pre On" to "Post Off" to "Post On." Therefore, these results suggest that low-dose Ferumoxytol infusion at 25% concentration of a single therapeutic dose (for iron-deficient anemia) was highly effective for vascular suppression and for improving conspicuity of nerves, with or without the use of non-contrast crusher gradients.

As used herein, the terms "comprises" and "comprising" are to be construed as being inclusive and open-ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

At least portions of the implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparati, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for imaging one or more peripheral nerves in an anatomical region of a subject, which method comprises:
introducing into a subject a dose of an iron-based contrast agent sufficient to cause a reduction of a $T_2$ relaxation time of the subject's blood; and
acquiring, from a magnetic resonance imaging (MRI) scanner, one or more MRI images of the anatomical region of the subject that includes the one or more peripheral nerves and at least one vessel, wherein the anatomical region has been impacted by the dose of the iron-based contrast agent, wherein the one or more MRI images are more sensitive to mobile water molecules than immobile water molecules, and wherein the one or more MRI images delineate the one or more peripheral nerves more conspicuously than the subject's blood contained in the at least one vessel adjacent to the one or more peripheral nerves.

2. The method of claim 1, wherein the one or more MRI images comprise: at least one $T_2$ weighted MRI image.

3. The method of claim 1, wherein magnetic resonance (MR) signals from the subject's blood in the region is substantially nullified in response to the dose of the iron-based contrast agent.

4. The method of claim 1, wherein the iron-based contrast agent comprises: at least one of an ultrasmall supraparamagnetic iron oxide (USPIO) contrast agent, a supraparamagnetic iron oxide (SPIO) contrast agent, a non-SPIO iron-based contrast agent.

5. The method of claim 4, wherein the USPIO contrast agent comprises one of: Feraheme or ferumoxytol.

6. The method of claim 4, wherein the dose of the iron-based contrast agent is about 5-50% of a nominal dose of 510 mg Fe when the USPIO contrast agent is ferumoxytol.

7. The method of claim 4, further comprising: determining the dose of the iron-based contrast agent based in part on, a difference between a relaxation rate of the subject's blood and a relaxation rate of the subject's fat.

8. The method of claim 4, wherein the $T_1$ relaxation time of the subject's blood is reduced to about a $T_1$ relaxation time of the subject's fat.

9. The method of claim 1, wherein acquiring the one or more $T_2$-weighted MRI images comprises operating the MRI scanner using an acquisition sequence that includes at least one of: a STIR (short tau inversion recovery) fast spin echo sequence, a fat-suppression fast spin echo sequence, a multi-echo chemical shift (Dixon) sequence, or PSIF (time reversed Free Induction Steady-state Precession) sequence.

10. The method of claim 1, wherein the acquired one or more $T_2$-weighted MRI images are characterized by a ratio of signals from the one or more nerves in the region and the signals from the subject's blood, and wherein the ratio is 10 or more.

11. The method of claim 10, wherein the ratio is 50 or more.

12. The method of claim 1, further comprising:
identifying the one or more peripheral nerves from the region on the acquired one or more $T_2$-weighted MRI images.

13. The method of claim 12, wherein the acquired one or more $T_2$-weighted MRI images comprise: 3D images, or multi-slices of images.

14. The method of claim 12, further comprising:
providing a 3-D rendering of the one or more peripheral nerves from the region.

15. The method of claim 14, further comprising:
longitudinally acquiring the one or more $T_2$-weighted MRI images of the subject from a period of time such that the one or more peripheral nerves are tracked over the period of time.

16. The method of claim 1, wherein introducing a dose comprises one of: an intravenous injection of the iron-based contrast agent when acquiring the one or more $T_2$-weighted MRI images, or an infusion of the iron-based contrast agent prior to acquiring the one or more $T_2$-weighted MRI images.

17. The method of claim 1, wherein the region of the subject has a condition from one of: a nerve inflammation, and a Wallerian degeneration.

18. The method of claim 1, wherein the region of the subject includes at least one lymph node and at least one lymph node vessel.

* * * * *